(12) United States Patent
Morris et al.

(10) Patent No.: US 7,710,001 B2
(45) Date of Patent: May 4, 2010

(54) PIEZOELECTRIC TRANSDUCERS AND ASSOCIATED METHODS

(75) Inventors: Dylan J. Morris, Seneca, SC (US);
David F. Bahr, Pullman, WA (US);
Michael Anderson, Troy, ID (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 12/241,333

(22) Filed: Sep. 30, 2008

(65) Prior Publication Data

US 2009/0085441 A1    Apr. 2, 2009

Related U.S. Application Data

(60) Provisional application No. 60/976,710, filed on Oct. 1, 2007.

(51) Int. Cl.
*H01L 41/08* (2006.01)
(52) U.S. Cl. .................. 310/334; 310/800
(58) Field of Classification Search .......... 310/328, 310/339, 800
See application file for complete search history.

(56) References Cited

U.S. PATENT DOCUMENTS

| | | | | |
|---|---|---|---|---|
| 3,247,711 A | * | 4/1966 | Howatt | 73/862.53 |
| 3,564,303 A | * | 2/1971 | Geil et al. | 310/319 |
| 4,064,375 A | * | 12/1977 | Russell et al. | 381/190 |
| 5,185,549 A | * | 2/1993 | Sullivan | 310/334 |
| 6,071,088 A | * | 6/2000 | Bishop et al. | 417/322 |
| 6,074,178 A | * | 6/2000 | Bishop et al. | 417/322 |

OTHER PUBLICATIONS

H. Wang and M. Toda, "Curved PVDF Airborne Transducer", IEEE Transactions on Ultrasonics, Ferroelectrics, and Frequency Control, vol. 46, No. 6, pp. 1375-1386, Nov. 1999.

M. Toda and S. Tosima, "Theory of Curved, Clamped, Piezoelectric Film, Air-Borne Transducers", IEEE Transactions on Ultrasonics, Ferroelectrics, and Frequency Control, vol. 47, No. 6, pp. 1421-1431, Nov. 2000.

M.C. Robinson, D.J. Morris, P.D. Hayenga, J.H. Cho, C.D. Richards, R.F. Richards, and D.F. Bahr, "Structural and electrical characterization of PZT on gold for micromachined piezoelectric membranes," Applied Physics A: Materials Science and Processing, vol. 85, pp. 135-140, 2006.

(Continued)

*Primary Examiner*—Mark Budd
(74) *Attorney, Agent, or Firm*—Perkins Coie LLP

(57) ABSTRACT

Piezoelectric transducers and associated methods are disclosed. In one embodiment, a piezoelectric transducer includes a support member, a piezoelectric element attached to the support member, and a pressurized chamber at one side of the piezoelectric element. The piezoelectric element comprises a flexible film, and the pressurized chamber contains a fluid that applies a static pressure to a side of the piezoelectric element.

18 Claims, 6 Drawing Sheets

OTHER PUBLICATIONS

M.S. Kennedy, A.L. Olson, J.C. Raupp, N.R. Moody, and D.F. Bahr, "Coupling bulge testing and nanoindention to characterize materials properties of bulk micromachined structures," Microsystem Technologies, vol. 11, No. 4-5, pp. 298-302, 2005.

J.J. Vlassak and W.D. Nix, "A new bulge test technique for the determination of Young's modulus and Poisson's ratio of thin films," Journal of Materials Research, vol. 7, No. 12, pp. 3242-3249, Dec. 1992.

L.E. Kinsler, A.R. Frey, A.B. Coppens, and J.V. Sanders, "Fundamentals of Acoustics", pp. 171-204, 4th Edition, John Wiley, 2000.

* cited by examiner

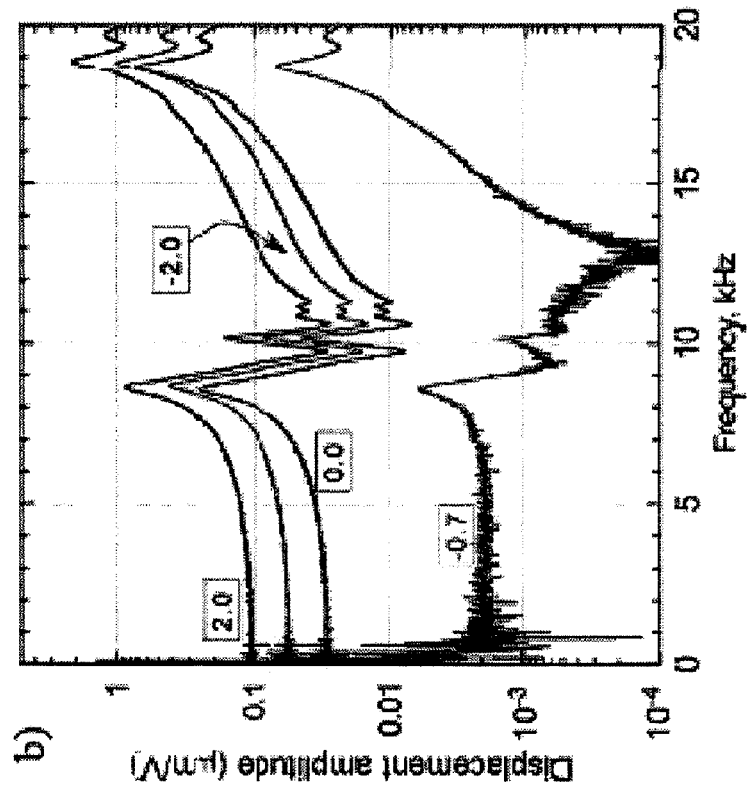
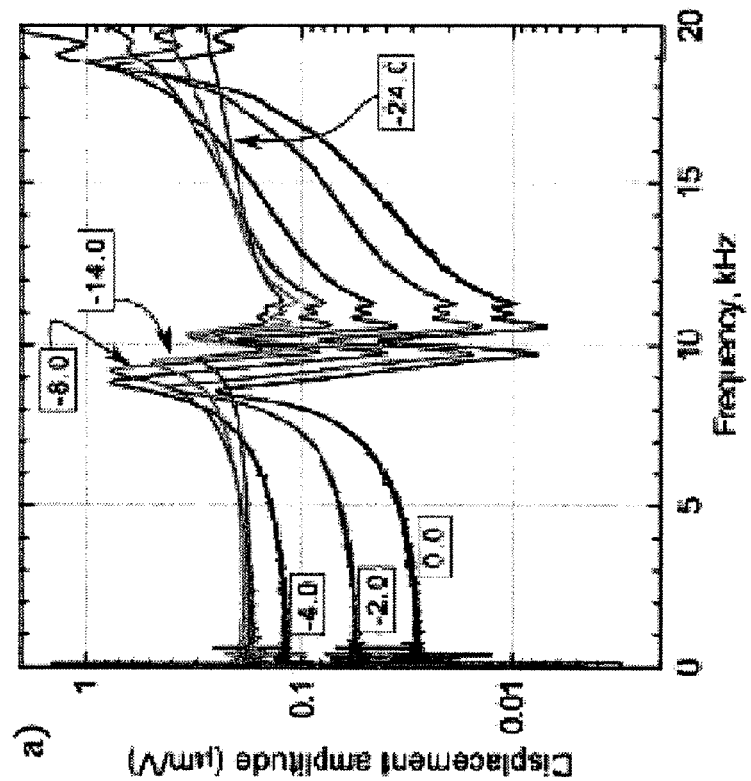
FIG. 5a
FIG. 5b

PIEZOELECTRIC TRANSDUCERS AND ASSOCIATED METHODS

CROSS-REFERENCE TO RELATED APPLICATION

This application claims priority to U.S. Provisional Application No. 60/976,710, filed on Oct. 1, 2007, the disclosure of which is incorporated herein by reference in its entirety.

STATEMENT REGARDING FEDERALLY-SPONSORED RESEARCH

This invention was made with government support under DASG6002C0084 awarded by Army/SMDC. The government has certain rights in the invention.

BACKGROUND

Laminated piezoelectric transducers have been used for acoustic transduction, fluid pumping, and power generation using flexure. Examples of acoustic applications include piezoelectric microphones, speakers, and piezoelectric pickups for electrically amplified instruments. Piezoelectric sensors are also used with high frequency sound in ultrasonic transducers for medical imaging.

In an effort to improve the performance of piezoelectric transducers, researchers have explored the properties of a device consisting of a curved piezoelectric diaphragm. Such approaches use the curvature of the diaphragm to convert extensional strains into radial motions, rather than relying upon flexure. This vibration is often referred to as the uniform mode. For this mode, it has been found that the resonance frequency and displacement amplitude of the curved diaphragm is inversely proportional to the radius of curvature, thus allowing for a magnification of radial displacements that cause acoustic waves in the surrounding medium. The investigations have also shown that clamped boundaries and extensional stresses cause additional flexural vibrations. The first natural frequency of the flexural mode is lower than that for the uniform mode, making it potentially useful for some applications. Experimental measurements and numerical computations have shown that the magnitude of the flexural vibrations is on the same order as those of the uniform mode. However, the flexural mode does not vibrate in phase across the diaphragm surface, leading to poor acoustic coupling to the surrounding medium.

BRIEF DESCRIPTION OF THE DRAWINGS

FIGS. 5a and 5b are plots of center displacement amplitude versus excitation frequency of a piezoelectric device in accordance with embodiments of the present disclosure.

DETAILED DESCRIPTION

Figure 1:
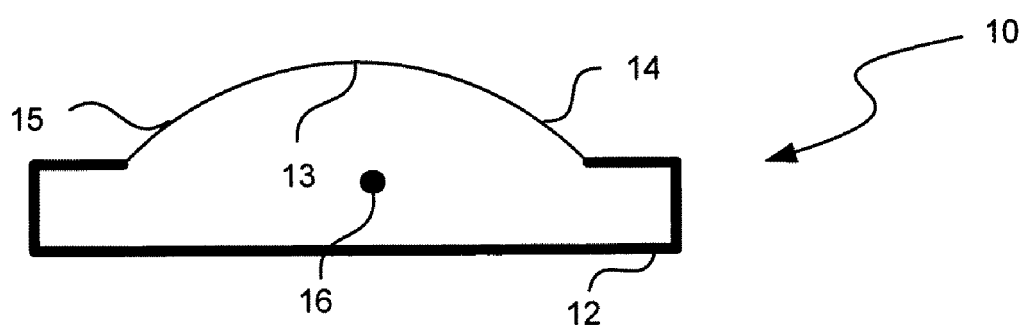
FIG. 1 is a cross-sectional view of a piezoelectric device in accordance with an embodiment of the present disclosure.

Specific details of several embodiments of the disclosure are described below with reference to piezoelectric transducers that have a static pressure applied to the piezoelectric diaphragm to introduce an initial static curvature. Several of the embodiments of the piezoelectric transducers described below can achieve greater displacement amplification than current designs, which are not pressurized, reducing power requirements for a given transducer application. However, several embodiments can have configurations, components or procedures different than those described in this section, and other embodiments may eliminate particular components or procedures. A person of ordinary skill in the relevant art, therefore, will understand that the invention may have other embodiments with additional elements, and/or may have other embodiments without several of the features shown and described below with reference to FIGS. 1-7.

Several embodiments described below are directed to piezoelectric transducers with increased amplification properties. In several embodiments, an increase in displacement amplification potential is achieved by applying a static pressure to one side of the (initially flat) piezoelectric diaphragm such that the diaphragm has a static curvature (e.g., a nominally spherical shape). Time-varying electric fields applied to the transducer then cause in-plane stresses which induce out-of-plane displacements in the diaphragm.

By pressurizing (or pre-stressing) the diaphragm, the need for lamination of the piezoelectric may be reduced or eliminated. Without being bound by theory, it is belied that the lamination can be reduced because the fundamental mode of deformation has changed from flexure to composite stretching-flexure of the diaphragm. When the piezoelectric diaphragm is statically pressurized, large increases (at least 4×) in the displacement amplitude of the diaphragm per unit supplied voltage can be achieved. The displacement amplitude associated with the first resonant frequency was observed to occur with little phase variation across the vibrating surface. These properties directly increase the acoustic pressure (the loudness) produced by a piezoelectric diaphragm when used as a sound source. By reciprocity, this effect is believed to translate into high sensitivity of the diaphragm when used as a "receiving transducer", that is, as a microphone or other types of sensor.

Experimental measurements indicate that the vibrations of a piezoelectric diaphragm transducer deformed (pre-stressed) into a spherical shape by application of a static pressure have unique and surprising properties. In particular, the curvature and tension associated with the application of external pressure amplifies the displacement amplitude that can be obtained, and the displacement amplitude associated with the first resonant peak has little or no phase variation across the vibrating surface. These properties may impact acoustic applications that require high output at low frequencies. As a result, a curved transducer formed by the application of external static pressure offers high displacement amplitude and a low-frequency mode that would couple efficiently to a surrounding acoustic medium by, e.g., controlling the applied external static pressure.

Application of a static pressure to one side of a piezoelectric diaphragm appears to significantly increase the sensitivity of this component when used as an electroacoustic transducer. Power consumption for such a transducer is potentially much lower than competing electromagnetic technology, as there is no electric coil to dissipate energy. Electromagnetic speakers are currently used in small-scale devices, such as cellular telephones. Application of power-saving speaker technology in applications like cell phones may increase battery life. Extension of this technology may also have applications in other technologies, such as acoustic ranging in air, medical ultrasound, hearing devices, noise-canceling headphones, and sonar.

The following description presents, among other things, experimental measurements of the displacement amplitude of curved piezoelectric diaphragm-type transducers in accordance with embodiments of the disclosure. The transducers can be formed by applying a static pressure to one side of the diaphragm that deformed the diaphragm into a desired shape (e.g., a nominally spherical shape). A harmonic time-varying voltage can then be applied to the diaphragm, causing harmonic displacements. Although several embodiments of the transducers are similar to the curved transducers described in the technical literature, e.g., H Wang, M Toda, "*Curved PVDF airborne transducer*", IEEE Transactions on Ultrasonics, Ferroelectrics, and Frequency Control, Vol. 46, No. 6, pp. 1375-1386, 1999. and by M Toda, S Tosima, "*Theory of curved, clamped, piezoelectric film, air-borne transducers*", IEEE Transactions on Ultrasonics, Ferroelectrics, and Frequency Control, Vol. 47, No. 6, pp. 1421-1431, 2000, the disclosures of which are incorporated herein in their entirety, in several embodiments of the transducers in accordance with the present disclosure, the diaphragm vibrated under tension and a static pressure. The experimental observations were surprising: as the magnitude of the static pressure increased and the transducer assumed a static spherical deformation, the amplitude of the vibrations rose in excess of 39 dB. The displacements at the natural frequency were observed to be in-phase across the diaphragm surface, as contrasted to the phase variation observed in the first flexural mode of the curved transducers previously described by H. Wang and M. Toda.

FIG. 1 is a cross-sectional view of an embodiment of a piezoelectric device 10 in accordance with an embodiment of the disclosure. In this embodiment, the piezoelectric device 10 has a support member 12, a piezoelectric element 14 attached to the support member 12, and a chamber 16 at one side of the piezoelectric element 14. The support member 10, for example, can be a housing having a cavity that at least partially defines the chamber 16. In other embodiments, the support member 12 can have a recess defining the chamber 16.

The piezoelectric element 14 can be a flexible film stack defining a piezoelectric diaphragm that provides the desired transduction of electrical and mechanical energies. The piezoelectric element 14 can include a first side 13 generally directed toward the chamber 16. The piezoelectric element 14 can also include a second side 15 opposite the first side 13. The second side 15 can be generally directed toward an environment 20 in which the piezoelectric device 10 is placed. The piezoelectric element 14 can include a single layer or multiple layers of Au, lead zirconate titanate ("PZT"), Pt, SiO2, p+Si, and/or other suitable piezoelectric material of any desired thicknesses.

In several embodiments, the chamber 16 can be pressurized with a fluid, such as a gas (e.g., air, nitrogen, argon, etc.), a liquid (e.g., water), and/or other suitable material. As a result, a first pressure in the chamber 16 can be greater than a second pressure of the environment 20. The pressure differential can pre-stress the piezoelectric element 14 to have a static curvature. In other embodiments, the chamber 16 can be pressurized such that the piezoelectric element 14 has at least a nominally spherical shape and is under tension. In yet other embodiments, the chamber 16 can be pressurized such that the piezoelectric element 14 can have a parabolic shape, an oval shape, and/or other desired shapes. In further embodiments, the chamber 16 can have at least a partial vacuum such that the first pressure is less than the second pressure.

Figure 2:
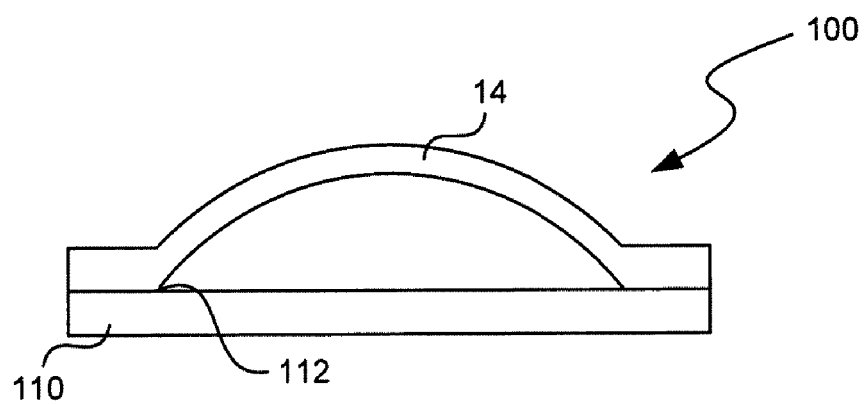
FIG. 2 is a cross-sectional view of a piezoelectric device in accordance with another embodiment of the present disclosure.

FIG. 2 is a cross-sectional view illustrating another embodiment of a piezoelectric device 100. In this embodiment, the piezoelectric device includes a support member 110, the piezoelectric element 14, and a chamber 112 at one side of the piezoelectric element 14. The support member 110 can be a rigid substrate (e.g., formed from plastic, metals, metal alloys, etc.) and the chamber 112 can be a pressurized bladder between the support member 110 and the piezoelectric element 14. The bladder can be a flexible, elastic balloon or other type of flexible, elastic member to impart a desired static curvature to the piezoelectric element.

Several embodiments of the pressurized piezoelectric diaphragms in FIGS. 1 and 2 can be used in the acoustic transducer for a cell phone microphone. Other embodiments of the pressurized piezoelectric diaphragm in FIGS. 1 and 2 can be used in the acoustic transducer for a PC microphone, iPod or portable music device, headphones, PDA, and/or other electronic devices. Further embodiments of the pressurized piezoelectric diaphragm in FIGS. 1 and 2 can be used in the acoustic transducer for music instrument amplification, such as "pickups" used for electrically amplified guitars. Yet further embodiments of the pressurized piezoelectric diaphragm in FIGS. 1 and 2 can be used in medical ultrasonic transducers and in medical imaging.

Specific examples of the pressurized piezoelectric diaphragm are described in detail below as illustrations and are not intended to limit the scope of the invention, as various modifications will become apparent to one skilled in the art.

Experimental Design and Construction

In one example, a 4 mm×4 mm square piezoelectric diaphragm was formed from standard silicon micromachining and thin-film processes, described by, e.g., M. C. Robinson, D. J. Morris, P. D. Hayenga, J. H. Cho, C. D. Richards, R. F. Richards, and D. F. Bahr, "Structural and electrical characterization of PZT on gold for micromachined piezoelectric membranes," Applied Physics A: Materials Science and Processing vol. 85, pp. 135-140, 2006; and M. S. Kennedy, A. L. Olson, J. C. Raupp, N. R. Moody, and D. F. Bahr, "*Coupling bulge testing and nanoindention to characterize materials properties of bulk micromachined structures,*" Microsystem Technologies, vol. 11, n 4-5, pp. 298-302, 2005, the disclosures of which are incorporated herein in their entirety. The individual laminae included Au, PZT, Pt, SiO2 and p+Si layers of thicknesses 0.3, 1.5, 0.2, 0.1, and 2.0 μm, respectively. The Au electrode on top of the 1.5 μm-thick PZT was 2.6 mm×2.6 mm and centered on the diaphragm. Capacitance was measured as 29 nF. Piezoelectric, mechanical, and dielectric properties of the PZT can be found in the aforementioned literature.

Overview of Experiment

Experimental measurements of the displacement amplitude of a curved piezoelectric diaphragm-type transducer are presented. The diaphragm includes a laminated PZT structure, square in shape, 4 mm side length, and has a 4.1 μm total thickness. The transducer was formed by applying a static pressure to one side of the diaphragm that deformed the diaphragm into a nominally spherical shape. This transducer had a diaphragm vibrated under tension and static pressure. Scanning laser vibrometer and cursory acoustic measurements were performed to characterize the performance of the transducer. The amplitude of diaphragm vibrations per supplied voltage rose in excess of 39 dB and the first natural frequency gradually changed as the static pressure was increased. The displacements at the first natural frequency were observed to be in-phase across the diaphragm surface, as contrasted to the phase variation observed in the first flexural mode of the curved transducers described in the literature. Thus, it is believed that a curved transducer formed by the application of external static pressure offers high displacement amplitude and a low-frequency mode that would couple efficiently to a surrounding acoustic medium.

Experimental Procedures

Figure 3:
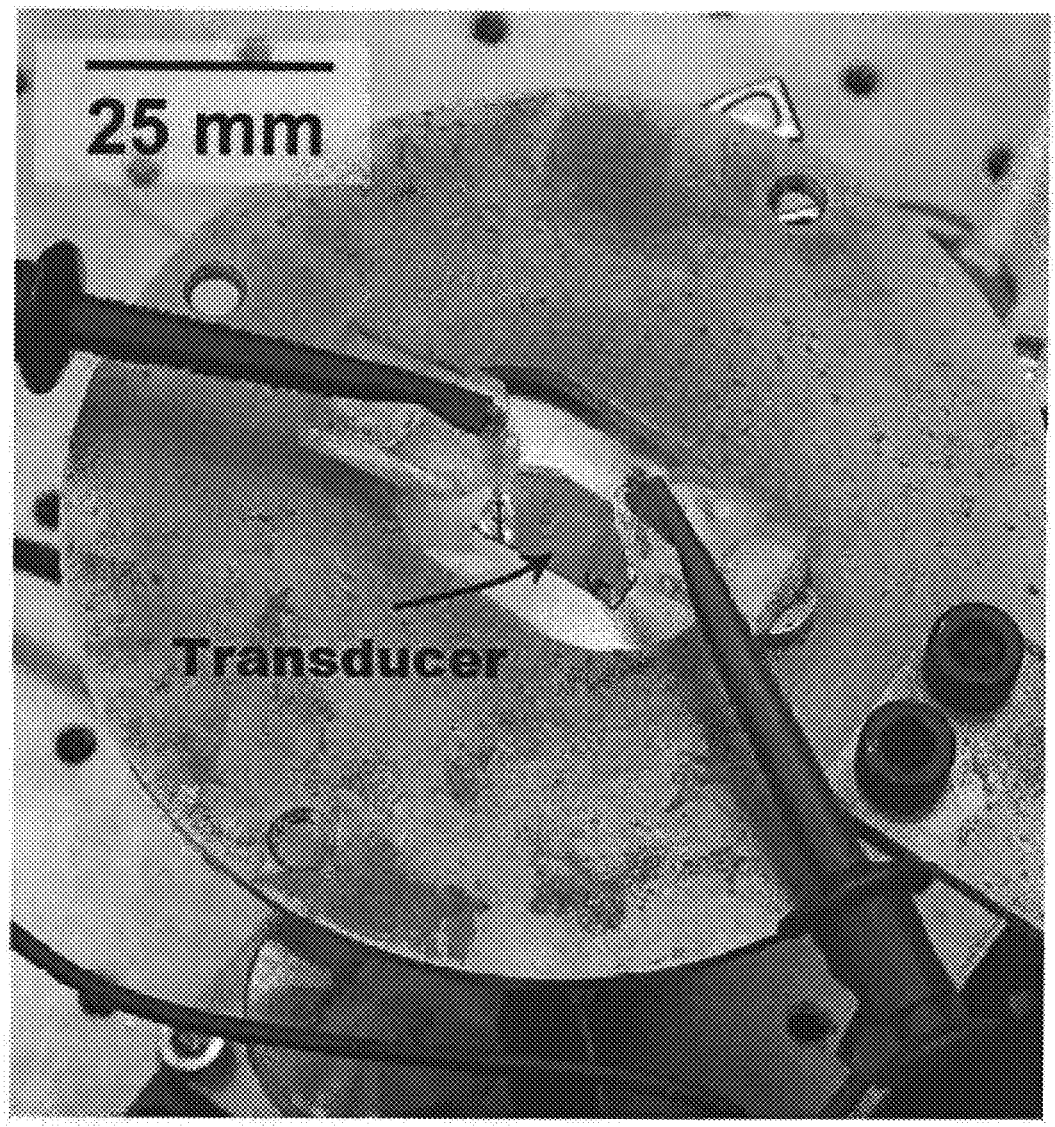
FIG. 3 is schematic diagram of an apparatus for testing a piezoelectric device in accordance with embodiments of the present disclosure.

The piezoelectric diaphragm transducer was mounted in an apparatus that allowed the application of a static pressure to one side of the diaphragm, and access to the other side for displacement and acoustic measurements. A photograph of the apparatus is shown in FIG. 3. A voltage source was connected to the electrical contacts of the diaphragm to cause it to undergo AC vibrations. In FIG. 3, the external static pressure source is not shown for clarity. Instead, FIG. 3 shows the vibrating surface area, electrical contacts, and relative fixture geometry. Behind the vibrating diaphragm was a sealed cavity connected to a manually-controlled bellows to control the static pressure. A sensor was located in the cavity to measure the cavity pressure.

Deflections and velocities of the diaphragm were measured with a scanning laser vibrometer (Polytec PI). Static deflections of the diaphragm center were measured as static pressure was applied. AC vibration amplitudes were measured over the diaphragm surface with a grid density of 0.125 mm. These results were then truncated at the diaphragm center, and the grid aligned with coordinate axes.

Acoustic measurements were collected at a distance of 10 cm from diaphragm and recorded with a dynamic signal analyzer (Agilent 35670A). A ¼" diameter free-field measurement microphone, aligned normal to the surface of the diaphragm, was used to measure the acoustic amplitude spectra at this distance.

Experimental Results

Figure 4:
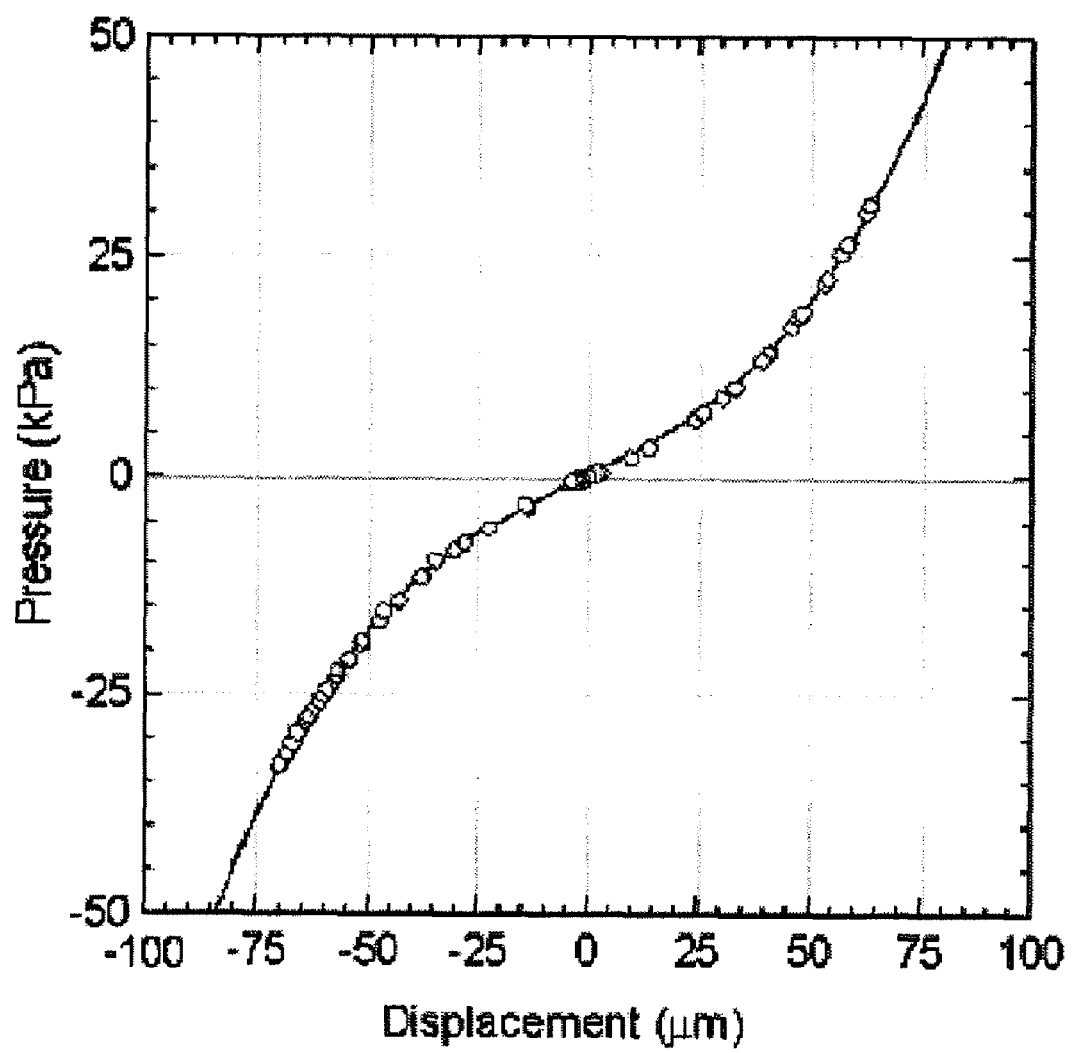
FIG. 4 is a plot of external static pressure versus static center displacement of a piezoelectric device in accordance with an embodiment of the present disclosure.

Application of a static external pressure to one side of the transducer diaphragm caused the diaphragm to assume a nominally spherical shape. Measurements of the displacement of the center of the diaphragm w versus externally applied static pressure P are shown in FIG. 4. Without being bound by theory, it is believed that the expected static-pressure P center-deflection w behavior of a pressurized membrane structure can be calculated as:

$$P = \gamma \frac{\sigma t}{a^2} w + \delta \frac{Et}{a^4} w^3,$$

where $\sigma$ is the residual stress, t is the thickness, a is the distance from center to edge, E is the effective elastic modulus, and $\gamma$ and $\delta$ are constants particular to the shape of the membrane. The constants can be found for a square diaphragm in, e.g., J. J. Vlassak and W. D. Nix, "*A new bulge test technique for the determination of Young's modulus and Poisson's ratio of thin films,*" *Journal of Materials Research*, Vol. 7, No. 12, pp. 3242-3249, 1992, the disclosure of which is incorporated herein in its entirety. The best-fit line is shown in FIG. 4. From these data, the residual stress $\sigma$ and modulus E for the diaphragm were estimated to be about 71 MPa and about 113 GPa, respectively. The curvature of a square pressurized membrane can be estimated as $1.66 (w/a^2)$ (See, e.g., Vlassak, Nix). At a static pressure of P=±20 kPa, the magnitude of the center deflection was approximately 50 µm, and the radius of curvature was estimated to be 48 mm.

The laser-vibrometer measurements of the displacement amplitude spectrum of the diaphragm center for several externally applied pressures are shown in FIGS. 5a and 5b. The displacement amplitudes were normalized to the voltage applied to the diaphragm transducer. As shown in FIG. 5a, the externally applied static pressure P ranged from P=0 to P=−24 kPa, which caused the diaphragm to deform statically inward. Negative static pressures were chosen to facilitate scanning laser vibrometer measurements of displacement amplitude. Similar behavior for positive static pressures were also observed. At 4 kHz, the displacement amplitude increased from 0.032 µm/V at a static pressure of P=0.0 kPa to 0.18 µm/V at a static pressure of P=−8.0 kPa. As the magnitude of the static pressure was increased, i.e., going below P=−8.0 kPa, the displacement amplitude at 4 kHz gradually decreased from 0.18 µm/V. The first resonance peak in displacement amplitude was observed at a frequency near 8 kHz. As the static pressure changed from P=0 kPa to P=−8.0 kPa, the frequency for the first resonance peak gradually increased from 8.55 kHz to 9.18 kHz.

The displacement amplitude spectrum with respect to the applied static pressure is shown in FIG. 5b. As shown in FIG. 5b, the static pressure ranged from P±2 kPa, with one measurement at P=−0.7 kPa. Typically, one might expect to observe the lowest displacement amplitude at a static pressure of P=0 kPa, but that was not the case. As shown in FIG. 5b, the lowest displacement amplitude was observed at a static pressure of P=−0.7 kPa. It is believed that this minimum displacement amplitude was observed because a static pressure of P=−0.7 kPa overcame a slight initial curvature of the diaphragm caused by residual stress. At a static pressure of P=−0.7 kPa and a frequency of 4 kHz, the center displacement amplitude was only 0.00185 µm/V, 39.8 dB smaller than the displacement amplitude at a static pressure of P=−8.0 kPa from FIG. 3a at the same frequency.

Without being bound by theory, the physical nature of the first resonant peak in displacement amplitude can be inferred from the measurements shown in FIGS. 5a and 5b. For a planar diaphragm, the resonant peak at the lowest frequency would presumably correspond to a flexural mode. This situation would correspond to the resonant peak at a frequency of 8.55 kHz and a static pressure of P=−0.7 kPa shown in FIG. 5b. A gradual departure of the frequency for the first peak in displacement amplitude from 8.55 kHz was observed as the magnitude of the static pressure was increased. This observation indicates that the mode corresponding to the first resonant peak was an evolution of a flexural mode.

Scanning Laser Vibrometer Measurements

Figures 6A, 6B:
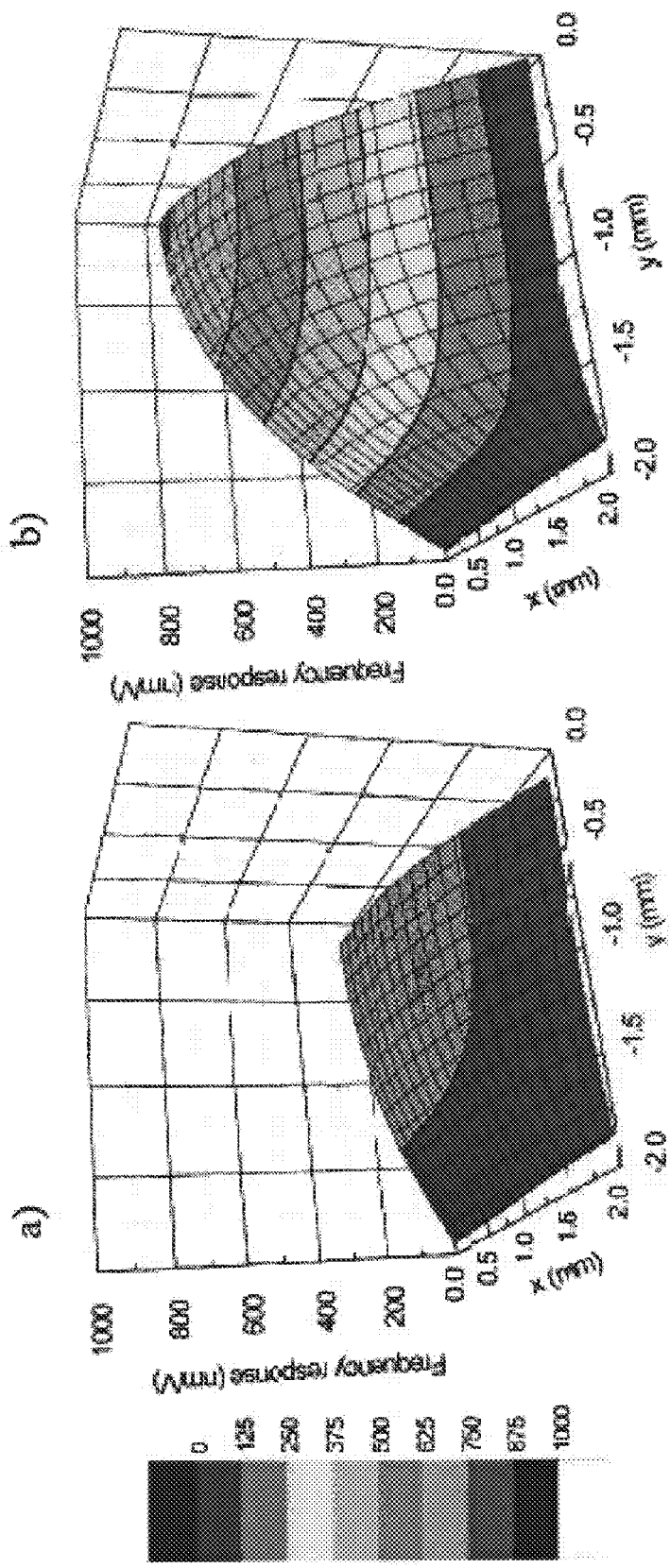
FIGS. 6a and 6b are plots of surface displacement amplitude versus excitation frequency of a piezoelectric device in accordance with embodiments of the present disclosure.

Scanning laser vibrometer measurements were taken to determine the shape of the mode associated with the first resonance peak. These measurements are shown in FIGS. 6a and 6b. The displacement amplitude was measured over one-quarter of the transducer area. The remaining area was observed to behave with even symmetry. In FIG. 6a, the displacement amplitude of the diaphragm is presented at a frequency of 8.56 kHz, corresponding to the first resonant peak at a static pressure of P=0 kPa shown in FIG. 5a. When a static pressure of P=−8 kPa was applied, the displacement amplitude shown in FIG. 6b was observed at a frequency of 9.22 kHz. This situation corresponded with the peak in displacement amplitude at P=−8 kPa static pressure contained in FIG. 5a. A breathing mode-shape was observed in FIGS. 6a and 6b for both static pressure conditions. These measurements contrast with the flexural modes observed in curved piezoelectric transducers without static pressure, in which phase variation in the displacement amplitude was observed for the first flexural mode (See, e.g., H Wang, M Toda). Consequently, it is believed that the diaphragm transducer operating with a static pressure on one side would couple more efficiently to the surrounding medium than a curved transducer without a static pressure applied to one side of the diaphragm.

Acoustic Measurements

Figure 7:
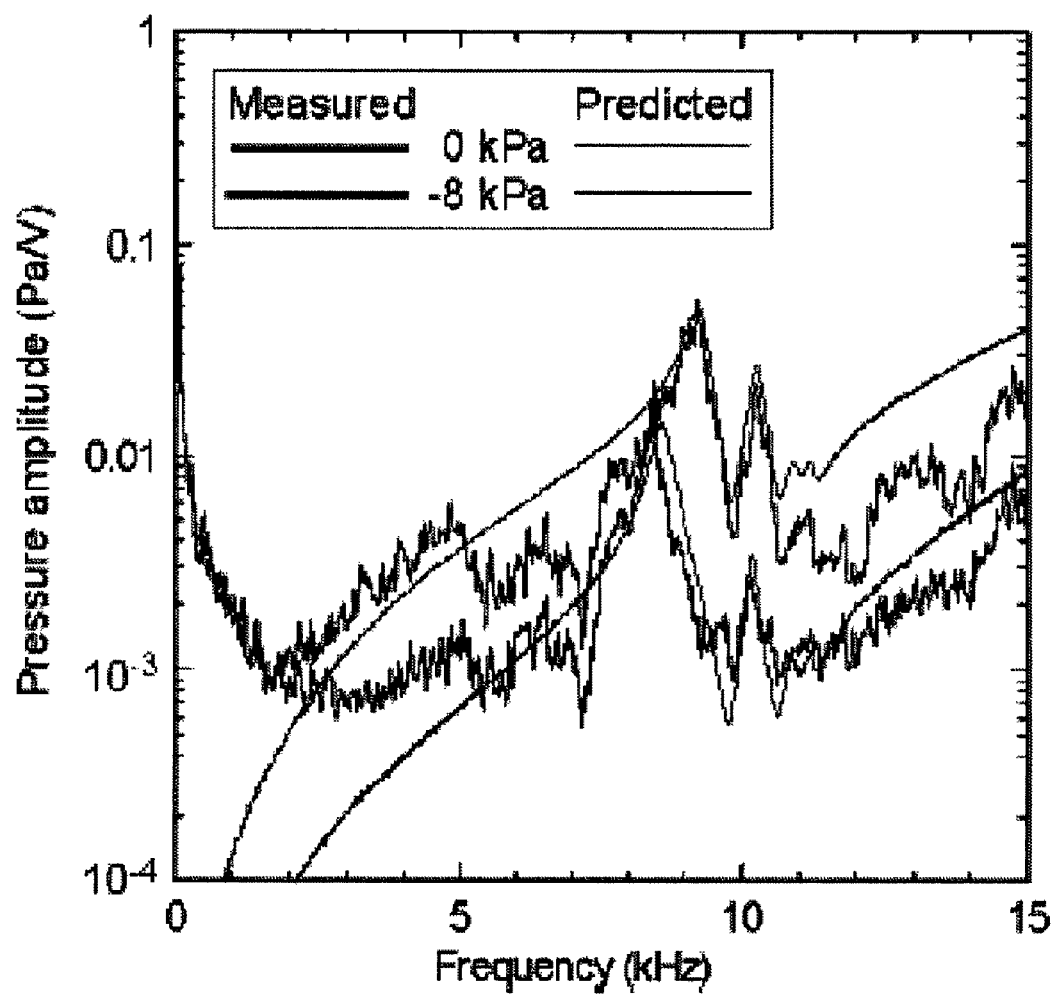
FIG. 7 is a plot of pressure amplitude versus excitation frequency of a piezoelectric device in accordance with embodiments of the present disclosure.

Acoustic measurements were performed to determine the coupling of the diaphragm transducer with applied static pressure to airborne acoustic waves. Comparison of the measured acoustic amplitude spectra and acoustic amplitude spectra predicted from laser vibrometer displacement amplitude measurements are shown in FIG. 7. The predicted acoustic pressure amplitude spectra were computed using a simple-source model for the transducer from, e.g., L E Kinsler, A R Frey, A B Coppens, and J V Sanders, "*Fundamentals of Acoustics*", 4th Edition, John Wiley, 2000, the disclosure of which is incorporated herein in its entirety, as follows:

$$p = \frac{1}{2}\rho c \frac{Q}{\lambda r},$$

where p is the acoustic pressure amplitude, $\rho=1.10$ kg/m$^3$, $c=343$ m/s are the density and sound speed of air at the measurement temperature and altitude, Q is the source strength, $\lambda=c/f$ is the wavelength, and r is the distance from the transducer to the microphone.

The source strength was based upon the displacement amplitude spectra for the center of the diaphragm taken from FIG. 5a, weighted by a factor of 41% derived from the mode shape measurements at the frequency of the first resonant peak in FIG. 6b to account for the variation in displacement amplitude across the diaphragm surface. The fixture geometry was not ideal for acoustic measurements. The wavelength in air at a frequency of 9 kHz was 3.8 cm, so that the fixture and table would cause a degree of baffle effect (interference) not contained in the simple-source model.

For the first resonant peak with P=0 kPa static pressure, the measured acoustic pressure amplitude was 0.0174 Pa/V at a frequency of 8.37 kHz, while the predicted acoustic pressure amplitude was 0.0095 Pa/V at a frequency of 8.64 kHz. For the first resonant peak with P=−8 kPa static pressure, the measured acoustic pressure amplitude was 0.042 Pa/V at a frequency of 9.3 kHz, while the predicted acoustic pressure amplitude was 0.046 Pa/V at a frequency of 9.29 kHz. These measurements indicated that the diaphragm displacements at the first resonant peak did indeed couple efficiently to the acoustic medium, as would be expected by a breathing-mode type vibration.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art may recognize. For example, while steps are presented in a given order, alternative embodiments may perform steps in a different order. The various embodiments described herein may be combined to provide further embodiments.

In general, the terms used in the following claims should not be construed to limit the invention to the specific embodiments disclosed in the specification, unless the above detailed description explicitly defines such terms. While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A piezoelectric device, comprising:
   a support member;
   a piezoelectric element attached to the support member, the support member and the piezoelectric element at least partially defining a chamber therebetween; and
   a fluid disposed in the chamber between the piezoelectric element and the support member, the fluid applying a first pressure to a first side of the piezoelectric element, the first pressure being greater than a second pressure on a second side of the piezoelectric element, wherein the first side is facing toward the chamber, and wherein the second side is opposite the first side, and further wherein the first pressure is static.

2. The piezoelectric device of claim 1 wherein the first pressure is greater than the second pressure such that the piezoelectric element has a static curvature.

3. The piezoelectric device of claim 1 wherein the first pressure is greater than the second pressure such that the piezoelectric element has a generally spherical shape.

4. The piezoelectric device of claim 1 wherein the piezoelectric device is configured as a sensor adapted to convert an acoustic signal into an electric signal.

5. The piezoelectric device of claim 1 wherein the piezoelectric element comprises a flexible diaphragm.

6. The piezoelectric device of claim 1 wherein the piezoelectric element comprises a flexible diaphragm having a film stack, the film stack including individual layers of gold, lead zirconate-titanate, platinum, silicon oxide, and doped silicon.

7. The piezoelectric device of 6 wherein the gold layer has a thickness of approximately 0.3 micron, the lead zirconate-titanate layer has a thickness of approximately 1.5 micron, the platinum layer has a thickness of approximately 0.2 micron, the silicon oxide has a thickness of approximately 0.1 micron, and the doped silicon layer has a thickness of approximately 2.0 micron.

8. A method for transducing signals, comprising:
   applying a static pressure to a first side of a piezoelectric element, the static pressure being greater than an external pressure on a second side of the piezoelectric element opposite the first side;
   inducing a static curvature in the piezoelectric element with the applied static pressure before an input signal is applied to the piezoelectric element;

applying the input signal to piezoelectric element with the static curvature; and transducing the input signal via the piezoelectric element.

9. The method of claim 8 wherein transducing the input signal via the piezoelectric element comprises applying a voltage and/or a current to the piezoelectric element.

10. The method of claim 8 wherein transducing the input signal via the piezoelectric element comprises converting mechanical energy applied to the piezoelectric element to an electrical signal.

11. The method of claim 8 wherein transducing the input signal via the piezoelectric element comprises converting an acoustic signal applied to the piezoelectric element to an electrical signal.

12. The method of claim 8 wherein transducing the input signal via the piezoelectric element comprises converting an ultrasonic signal applied to the piezoelectric element to an electrical signal.

13. The method of claim 8 wherein transducing the input signal via the piezoelectric element comprises converting a megasonic signal applied to the piezoelectric element to an electrical signal.

14. A piezoelectric device, comprising:

a support member;

a piezoelectric element attached to the support member, the support member and the piezoelectric element at least partially forming a chamber therebetween, wherein the piezoelectric element has a first side facing the support member and a second side opposite the first side; and a gas in the chamber formed by the piezoelectric element and the support member, the gas applying a static pressure to the first side of the piezoelectric element, the static pressure forcing the piezoelectric element to extend away from the support member with a static curvature.

15. The piezoelectric device of 14 wherein the piezoelectric element comprises a film stack including layers of gold, lead zirconate-titanate, platinum, silicon oxide, and doped silicon; and the gold layer has a thickness of approximately 0.3 micron;

the lead zirconate-titanate layer has a thickness of approximately 1.5 micron;

the platinum layer has a thickness of approximately 0.2 micron;

the silicon oxide has a thickness of approximately 0.1 micron; and the doped silicon layer has a thickness of approximately 2.0 micron.

16. The piezoelectric device of claim 14 wherein the first pressure is greater than a second pressure at the second side of the piezoelectric element.

17. The piezoelectric device of claim 14 wherein the static pressure forces the piezoelectric element to have a generally spherical shape, a parabolic shape, or an oval shape.

18. The piezoelectric device of claim 14 wherein the piezoelectric element comprises a film stack including individual layers of gold, lead zirconate-titanate, platinum, silicon oxide, and doped silicon.

* * * * *

UNITED STATES PATENT AND TRADEMARK OFFICE
CERTIFICATE OF CORRECTION

PATENT NO. : 7,710,001 B2  Page 1 of 1
APPLICATION NO. : 12/241333
DATED : May 4, 2010
INVENTOR(S) : Dylan J. Morris et al.

It is certified that error appears in the above-identified patent and that said Letters Patent is hereby corrected as shown below:

In the Claims:
In column 8, line 53, in claim 7, after "device of" insert -- claim --.

In column 10, line 7, in claim 15, after "device of" insert -- claim --.

Signed and Sealed this

Twelfth Day of October, 2010

David J. Kappos
*Director of the United States Patent and Trademark Office*